United States Patent [19]

Rollag et al.

[11] 4,201,663
[45] May 6, 1980

[54] METHOD AND APPARATUS FOR THE ENHANCED TREATMENT OF FOOD PROCESSING WASTE WATERS USING AEROBIC MICROORGANISMS

[76] Inventors: Dwayne A. Rollag, 320 Lincoln La.; James N. Dornbush, 324 Elm Ave., both of Brookings, S. Dak. 57006; Robert C. Renner, 124 S. Bryan #4, Fort Collins, Colo. 80521

[21] Appl. No.: 940,328

[22] Filed: Sep. 7, 1978

[51] Int. Cl.² .................................................. C02C 1/17
[52] U.S. Cl. ................................... 210/16; 210/198 R; 210/242 A; 55/73; 55/387; 435/262; 422/4; 422/5
[58] Field of Search ................. 422/4, 5; 71/9; 210/2, 210/12, 16, 17, 13, 20, 150, 151, 177, 180, 198 R, 199, 205, 242 A, 242 R, 11, 18; 195/2, 116; 55/73, 74, 98, 387

[56] References Cited

U.S. PATENT DOCUMENTS

| 301,006 | 6/1884 | Reihlen | 195/116 |
|---|---|---|---|
| 1,717,100 | 6/1929 | Downes | 210/180 |
| 2,200,581 | 5/1940 | Pruss et al. | 195/2 |
| 2,793,096 | 5/1957 | Pomeroy | 195/2 |
| 3,216,905 | 11/1965 | Baptist | 55/74 |
| 3,828,525 | 8/1974 | Copa | 55/74 |
| 3,855,121 | 12/1974 | Gougl | 55/73 |
| 3,933,628 | 1/1976 | Varani | 210/12 |
| 4,046,691 | 9/1977 | Irons | 210/242 R |
| 4,073,686 | 2/1978 | Adams | 195/116 |
| 4,086,167 | 4/1978 | Tapola | 210/150 |

FOREIGN PATENT DOCUMENTS

| 596423 | 4/1960 | Canada | 210/17 |
|---|---|---|---|
| 2248256 | 4/1973 | Fed. Rep. of Germany | 55/99 |
| 2237929 | 2/1974 | Fed. Rep. of Germany | 55/84 |
| 2540691 | 3/1977 | Fed. Rep. of Germany | 55/98 |
| 2558256 | 7/1977 | Fed. Rep. of Germany | 55/73 |
| 2605606 | 8/1977 | Fed. Rep. of Germany | 55/74 |
| 2331367 | 1/1975 | France | 55/73 |

Primary Examiner—Ernest G. Therkorn
Attorney, Agent, or Firm—Donald A. Jacobson

[57] ABSTRACT

A method and apparatus for treating waste water, containing large quantities of organic material, by means of an aerobic bacteriological process which uses a plastic film to support an air transport system and a blanket of inexpensive biodegradable material which provides the functions of heat insulation, odor absorption/adsorption and mechanical support for attached aerobic microorganisms which act to decompose odorous gases.

14 Claims, 2 Drawing Figures

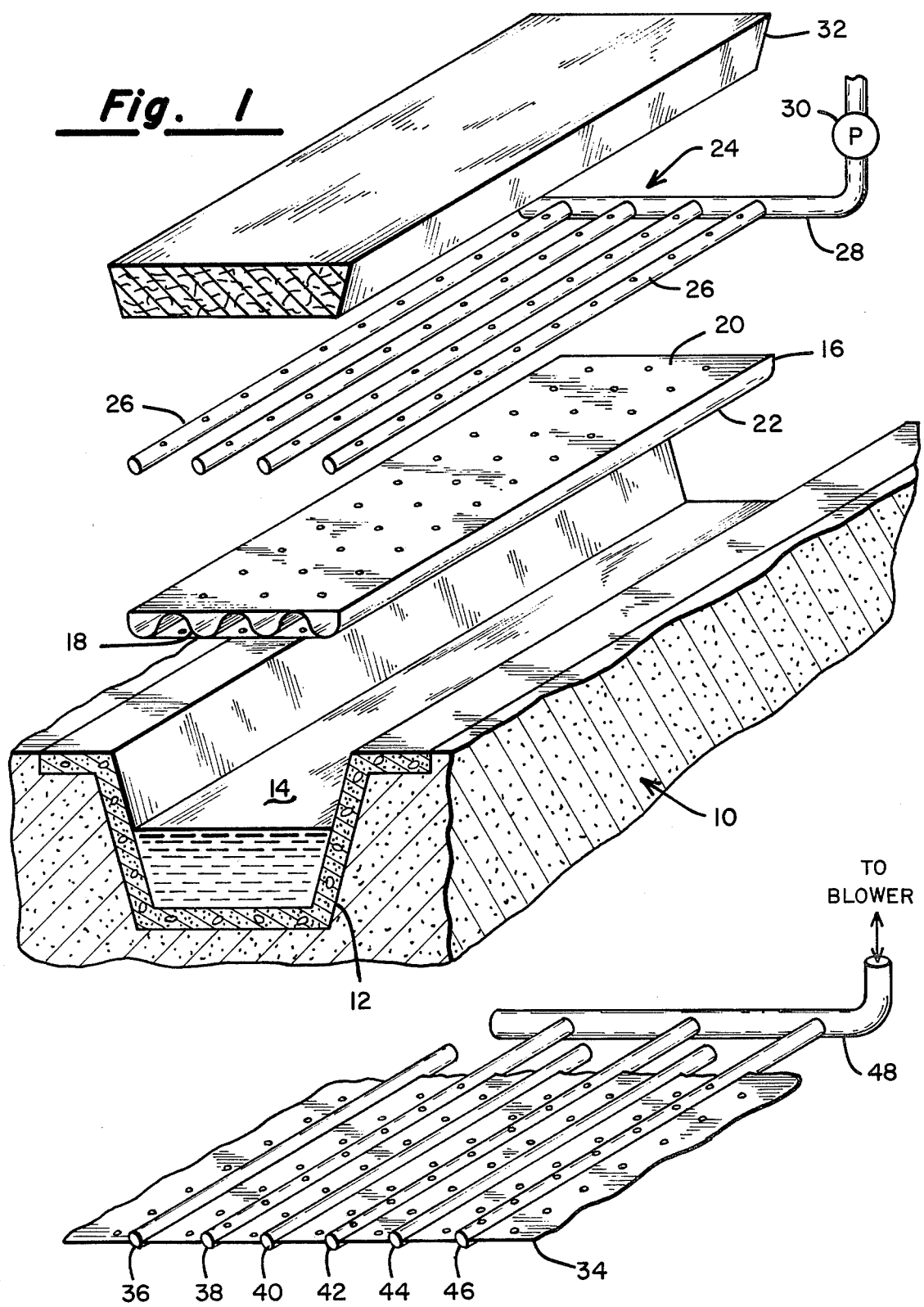

METHOD AND APPARATUS FOR THE ENHANCED TREATMENT OF FOOD PROCESSING WASTE WATERS USING AEROBIC MICROORGANISMS

BACKGROUND OF THE INVENTION

It is oftentimes necessary to purify the waste waters from meat, poultry, and other food processing plants, as well as from feed lots, in a special manner because of their high organic content. Present methods in use include the use of continuous or batch fed lagoons having anaerobic microorganisms contained therein. This type of process generates large quantities of gas which have extremely offensive odors. In order to complete the metabolic destruction of the suspended organic material in a reasonably short period of time, it is desirable to have the water at a temperature which is higher than the typical ambient outdoor temperature. The most economical method of maintaining an elevated temperature is by retention of the heat normally present in processed waste water and the heat generated by the bacteriological process. This can most readily be accomplished by some form of surface insulation on the surface of the waste water contained in the lagoon.

Insulation currently used are synthetic foams such as styrofoam or polyurethane. These materials in the foam form will float upon the surface of the water and will provide a reasonably low coefficient of heat transfer.

A second insulation in common use is a scum layer associated with certain meat packing operations. The scum layer is developed by beef processing waste waters and is limited to such wastes, as only these waters contain the materials which will both float and develop a scum.

The use of styrofoam or polyurethane foam insulation is relatively expensive and introduces a material into the environment which is not readily biodegradable. The scum layer method is inexpensive but is only available for beef processing waste waters and is a less efficient heat insulator than foam insulation. As a further disadvantage, neither of these types of insulation will absorb or adsorb any odors generated by the anaerobic bacteriological process.

The severe odor problem which is inherent in the anaerobic lagoon treatment method greatly limits the possible locations for treatment sites and creates a severe environmental problem.

OBJECTS

It is accordingly a general object of this invention to provide an improved method and apparatus for the aerobic bacterial decomposition of odorous gases generated by the anaerobic bacteriological decomposition of organic liquids to thereby minimize the odor problem inherent in prior art anaerobic lagoon treatment processes.

It is another object of this invention to use an inexpensive supporting layer for an air transport system and inexpensive, biodegradable insulation materials to cover the supporting layer. This insulation material also provides surfaces upon which aerobic bacteria can adhere and grow.

It is yet another object of this invention to provide biodegradable insulation, bacterial support materials which will, in themselves, remove objectionable odors by absorption or adsorption.

These and other objects and advantages of the invention will become apparent from the following detailed description of the preferred embodiment when considered in light of the accompanying drawings.

DESCRIPTION OF THE DRAWINGS

FIG. 1 is an exploded cross-sectional view of a waste treatment lagoon illustrating the apparatus used in practicing the method of the present invention; and FIG. 2 illustrates an alternative arrangement for introducing air into the microorganism containing medium.

DETAILED DESCRIPTION OF PREFERRED EMBODIMENT

Referring first to FIG. 1, there is indicated generally by numeral 10 an anaerobic waste water treatment lagoon which may comprise a trench which is dug into the ground and which is lined with asphalt or concrete, the lining being identified by numeral 12. The lagoon may be of uniform depth in the range of from 15 to 20 feet, having sloping sides with a 2 foot vertical drop for every 1 foot of horizontal displacement. The blacktop or concrete lining prevents erosion due to the passage of waste water therethrough. The lagoon is preferably long and narrow to facilitate removal of solids that may accumulate over the years.

The waste water to be treated, identified by numeral 14 is high in organic content and may be fed into the lagoon on a continuous basis or in batches at predetermined intervals. The inlet and outlet supply lines for the lagoon 10 are not shown.

As is set out in the introductory portion of this specification, the anaerobic microorganisms contained in the waste water 14 to be treated break down the organic material, but in doing so, tend to produce large quantities of a gas having an extremely offensive odor. In order to obviate this problem, the method of the present invention employs an aerobic bacteriological process which reacts with the gas given off by the waste water under treatment in the lagoon which thereby reduces the odors emanating from the treatment process. In order to understand the method employed, it is deemed expedient to explain in detail, the apparatus utilized in practicing the method. In this regard, continued attention is directed to the exploded view of FIG. 1.

In FIG. 1, there is identified by numeral 16 a floatation layer which may comprise a corrugated plastic core 18 sandwiched between an upper plastic sheet 20 and a lower plastic sheet 22. The floatation member 16 is sealed at its ends and alternate furrows defined by the corrugated core 18 are filled with air or other suitable buoyant gas. The upper plastic sheet or film 20 and lower sheet or film 22 are perforated along remaining rows such that the gas emanating from the lagoon may pass through the floatation layer while the layer floats upon the upper surface of the liquid 14 contained within the lagoon.

Positioned above the floatation layer 16 is an aeration device, indicated generally by numeral 24 which includes a plurality of elongated, perforated plastic tubes 26 which extend lengthwise along the lagoon in a parallel and spaced apart relationship. Each of the pipes 26 communicates with a manifold 28 which extends transversely across the width dimension of the lagoon, the manifold 28 being connected either to the inlet of a motor driven blower 30 or its outlet. Thus, in carrying out the invention, air may be forced through the manifold 28 and through the pipes 26 so as to pass through the perforations contained along the length of the pipe. Alternatively, the blower 30, if properly connected, may cause air to be drawn through the perforations in the parallel pipes 26 and from there through the manifold 28 and out through the blower 30.

Disposed on top of the floatation layer 16 and aeration system 24 is a bed or layer of inexpensive biodegradable material identified by numeral 32. In carrying out the present invention, the bed of material 32 which floats atop the upper surface of the liquid contained within the lagoon may comprise sawdust, manure, straw or a combination of these materials.

The layer 32 acts as an insulator to contain the heat originally present in the waste water as it is discharged into the lagoon as well as the heat produced by the normal anaerobic bacteria action. In addition, the layer 32 tends to absorb or adsorb gases given off by the bacteriological anaerobic process and provides large surface area upon which aerobic bacteria and microorganisms can grow. These aerobic microorganisms present in the bedding material 32 have the capability of decomposing the odorous gases generated in the anaerobic lagoon and thereby greatly reducing or eliminating the noxious odors normally given off by the anaerobic lagoon.

Where straw is used for the microorganism containing medium 32, the layer should be in the range of from 18 to 36 inches in thickness. Where manure is the microorganism containing medium, a thickness of from 8 inches to 16 inches has been found to be sufficient. By mixing sawdust and manure to a depth of from 20 to 28 inches, the same desirable result may be achieved. It is to be noted, however, that these materials are exemplary only and that any non-toxic material providing adequate surface for absorption and adherence of biological growth would be suitable, provided it will float or could be supported upon the floatation layer 16.

It has also been found that periodic spraying of the medium 32 with water, sewage or the contents of waste water treatment units such as aerated lagoon or activated sludge processes is deemed expedient to provide seed organisms, proper moisture content for biological growth, a pH buffer as well as a reduction in wind erosion of the medium.

The purpose of the aeration apparatus 24 is to maintain the microorganism containing medium 32 in an aerobic rather than an anaerobic condition. It has been found that when this is accomplished, the odor removal process is enhanced. The aeration system 24 utilizing the perforated pipes 26 when placed on or near the bottom of the medium 32 may be used to supply air-oxygen to the medium layer either by induced or forced-draft aeration. When the manifold 24 is connected to the inlet of the pump 30, air is drawn downward through the medium 32 and through the parallelly extending pipes 26 and out the exhaust outlet of the blower. Thus, the flow of air through the medium 32 is said to be induced. When the outlet of the blower 30 is connected to the manifold 24 and air is forced through the pipes 26 and out through their perforations, the air flows upward through the medium 32 in a forced flow arrangement. In either instance, the air flow serves to provide the required oxygen for direct oxidation of odorous gases and for the bacteria which grow and become attached to the microorganism containing medium. These oxygen-requiring bacteria, i.e., aerobic bacteria, can use the odorous, carbonaceous matter in the gases escaping up through the floatation layer 16 from the anaerobic lagoon 14 as "food" which they convert to nuisance-free carbondioxide and water.

Referring next to FIG. 2, there is shown an alternative arrangement for constructing an integrally formed air distribution and floatation member. In this arrangement there is a generally planar sheet 34 having a plurality of hollow compartments 36–46 formed longitudinally along its length in a parallel and spaced apart fashion. As is illustrated, the tubular portions 36, 40, 44 are sealed at one end and at the opposite end connect to a manifold type 48. These tubes 38, 42 and 46 are perforated along their length to permit either induced or forced air to pass therethrough. Disposed between the perforated ribs or pipes are a plurality of non-perforated ribs 36, 40 and 44. The non-perforated ribs may be filled with a suitable gas to provide overall buoyancy to the mat 34. In order to permit the noxious lagoon gases to pass through the mat 34 and into the medium 32, the mat 34 is also appropriately perforated in the areas thereof between the longitudinally extending ribs. By suitable design, it is possible to construct a floatation layer sufficient to support a predetermined weight of the microorganism containing medium 32 while it floats upon the surface 14 of the treatment lagoon.

OPERATION

With the foregoing description of the apparatus utilized in mind, consideration will next be given to the method whereby the gases emanating from an anaerobic waste water treatment lagoon are effectively deodorized.

First, the lagoon is filled with the waste water to be treated, either on a continuous or in a batch fashion by means of an inlet pipe and outlet pipe (not shown). Next, a floatation layer is disposed on the surface of the liquid contained within the treatment lagoon, this layer being perforated to permit the passage of anaerobic gases through it. Disposed on top of the floatation layer is a suitable microorganism containing medium, such as straw, manure, or sawdust or a combination of these materials. Disposed between the aforementioned medium and the floatation layer is a system whereby oxygen containing gases, e.g., air, can be drawn through or forced through the medium.

The noxious, odorous gases emanating from the anaerobic lagoon seep through the perforations in the floatation mat and upward into the medium. Because of the nature of the medium employed, these gas molecules are absorbed by the medium or are adsorbed. Furthermore, the aerobic bacteria or microorganisms contained within the medium feed upon the anaerobic gases thereby converting them to carbondioxide and water, both of which are relatively free of noxious odors. Also, the action of the air flowing through the medium is found to oxidize certain of the anaerobic gases which also converts them to a less odorous condition.

While there has been shown and described the preferred method and apparatus comprising the present invention, it is apparent that various changes, modifications and substitutions may be made without departing from the spirit and scope of the invention. Accordingly, the true scope of the invention is to be determined from the appended claims.

What is claimed is:

1. A method of reducing odors eminating from an anaerobic lagoon comprising the steps of:

(a) providing a floatation layer pervious to gases produced by the lagoon on the surface of the liquid contained in said anaerobic lagoon of sufficient size so that it substantially covers the lagoon surface;

(b) covering said floatation layer with a gas pervious medium containing microorganisms that eliminate odors from anaerobic lagoon gas; and (c) aerating said medium to enhance the growth of said microorganisms.

2. The method as in claim 1 and further including the step of periodically spraying said medium with a microorganism containing liquid.

3. The method as in claim 1 wherein said aerating step includes the forced draft or induced draft of an oxygen bearing gas mixture through said medium.

4. The method as in claim 1 wherein said medium includes sawdust.

5. The method as in claim 1 wherein said medium includes manure.

6. The method as in claim 1 wherein said medium includes straw.

7. Apparatus for reducing odors eminating from an anaerobic lagoon comprising:

(a) a floatation device disposed on the surface of the liquid contained in said lagoon which is pervious to gases produced by said lagoon and substantially covers said lagoon;

(b) a gas pervious medium covering said floatation device which contains microorganisms which eliminate odors; and (c) means for passing an oxygen bearing gas mixture through said medium, said means being disposed between the upper surface of said liquid in said lagoon and the exposed surface of said medium.

8. Apparatus as in claim 7 wherein said floatation device comprises a layer of plastic material having spaced apart, air containing, sealed chambers, the plastic material having a plurality of apertures located between said sealed chambers, said apertures permitting the flow of odor laden anaerobic gases therethrough.

9. Apparatus as in claim 7 wherein said means comprises:

(a) a network of parallel, interconnected, perforated tubes extending along the length dimension of said lagoon and disposed between the upper liquid surface of said lagoon and the upper surface of said medium; and (b) means for forcing air through said network of perforated tubes.

10. Apparatus as in claim 9 wherein said last mentioned means comprises a motor driven blower having its outlet connected to said network of perforated tubes.

11. Apparatus as in claim 9 wherein said last mentioned means comprises a motor driven blower having its inlet connected to said network of perforated tubes.

12. Apparatus as in claim 7 wherein said microorganism containing medium comprises a layer of sawdust of a predetermined thickness affording sufficient insulating value to retain the liquid in said lagoon at an elevated temperature.

13. Apparatus as in claim 7 wherein said microorganism containing medium comprises a layer of manure of a predetermined thickness affording sufficient insulating value to retain the liquid in said lagoon at an elevated temperature.

14. Apparatus as in claim 7 wherein said microorganism containing medium comprises a layer of straw of a predetermined thickness affording sufficient insulating value to retain the liquid in said lagoon at an elevated temperature.

* * * * *